United States Patent [19]

Breen et al.

[11] Patent Number: 4,848,251

[45] Date of Patent: Jul. 18, 1989

[54] METHOD TO ENHANCE REMOVAL OF SULFUR COMPOUNDS BY SLAG

[75] Inventors: Bernard P. Breen, Laguna Beach, Calif.; James E. Gabrielson, Plymouth, Minn.; John H. Pohl, Mission Viejo, Calif.

[73] Assignee: Consolidated Natural Gas Service Company, Cleveland, Ohio

[21] Appl. No.: 159,678

[22] Filed: Feb. 24, 1988

[51] Int. Cl.$^4$ ............................................. F23D 1/00
[52] U.S. Cl. .................................................. 110/347
[58] Field of Search .............. 110/342, 343, 344, 345, 110/347

[56] References Cited

U.S. PATENT DOCUMENTS

| | | | |
|---|---|---|---|
| 4,217,132 | 8/1980 | Burge et al. | 431/9 |
| 4,232,615 | 11/1980 | Brown | 110/342 |
| 4,285,283 | 8/1981 | Lyon | 110/347 |
| 4,407,206 | 10/1983 | Bartok et al. | 110/347 |
| 4,586,443 | 5/1984 | Burge et al. | 110/264 X |
| 4,685,404 | 8/1987 | Sheppard et al. | 110/347 X |

OTHER PUBLICATIONS

Breen et al. "A Review of In-Furnace NO$_x$ Reduction and SO$_x$ Reduction by Sorbent Injection", EPRI CS-1382, 11, 1982.
England et al. "Coal-Fired Precombustors for Simultaneous NO$_x$, SO$_x$ and Particulate Control", EPA/EPRI Primary Source NO$_x$ Symposium, Boston, Mass., May 1985.

Primary Examiner—Edward G. Favors
Attorney, Agent, or Firm—Buchanan Ingersoll

[57] ABSTRACT

Disclosed is a process for combustion of carbonaceous substances containing ash and sulfur in slagging combustors wherein the fraction of sulfur retained in the slag is enhanced, emissions of nitrogen oxide are reduced, and operating problems with the furnace are avoided. The process comprises control of slag within a temperature range of 2000°–2500° F., slag stoichiometry less than oxidizing, and gas phase stoichiometry near stoichiometric.

8 Claims, 3 Drawing Sheets

METHOD TO ENHANCE REMOVAL OF SULFUR COMPOUNDS BY SLAG

BACKGROUND OF THE INVENTION

1. Field of the Invention

The present invention relates to a method for the combustion of coal wherein the emissions of $SO_2$ and $NO_x$ are reduced by retention of sulfur compounds in the slag and for the reduction of fuel nitrogen compounds to molecular nitrogen in the combustion chamber.

2. Description of the Prior Art

In the combustion of carbonaceous materials such as coal which contain sulfur and ash, oxygen combines with the sulfur to produce sulfur dioxide. Production of sulfur dioxide is undesirable and emission of sulfur dioxide is limited by government regulation for power plants built after 1972 and may soon be limited for power plants built before 1972. To comply with these regulations, utilities may elect to use naturally occurring low sulfur coals, clean high sulfur coals to reduce the sulfur content, substitute low sulfur oil or natural gas, inject calcium based sorbents into the boiler, or use calcium, sodium, or magnesium based solutions to scrub sulfur dioxode from the stack gases. All these techniques are expensive and some cannot be easily retrofitted to existing plants. As a result, attempts have been made to develop a process to burn high sulfur coal without increasing the emissions of sulfur dioxide.

In U.S. Pat. No. 4,232,615, Brown teaches that sulfur can be captured as a sulfide under rich conditions. Lyon et al. in U.S. Pat. No. 4,285,283 teach that sulfur can be captured in the slag and separated as water soluble sulfides at fuel equivalence ratios greater than 1.5 and temperatures between 1200° and 1400° C. (2190° and 2550° F.). In U.S. Pat. No. 4,407,206, Bartok et al. teach that sulfur capture in combustion of coal can be as high as 70 percent at a fuel equivalence ratio of 1.5 and 80–95 percent combustion of the coal at 1200°–1300° C. (2190°–2370° F.). A maximum of 35 percent sulfur retention was achieved at similar conditions and 1400° C. (2550° F.).

In the article "A Review of In-Furnace $NO_x$. Reduction and $SO_x$ Reduction by Sorbent Injection", EPRI CS-1382, Breen et al. teach that retention of sulfur in solids or liquids is favored by substoichiometric conditions and decreases with increasing temperature.

England et al. in their article "Coal-Fired Precombustions for Simultaneous $NO_x$, $SO_x$ and Particulate Control", EPA/EPRI Primary Source $NO_x$ Symposium, Boston, Mass., May, 1985, teach that retention of sulfur as sulfide under rich conditions is favored over retentions of sulfur as sulfate under lean conditions at high temperatures.

Finally, in U.S. Pat. No. 4,523,532, Moriarty et al. teach that sulfur can be retained in the slag under conditions of low excess air.

None of the above processes have been brought to commercial success because of the problems in applying the technology to existing combustors, problems retaining the sulfur in the slag and achieving good burnout, the potential of interrupted slag flow, and the potential of increased tube wastage. Therefore, a need exists for an inexpensive process, retrofitable to existing boilers, to remove sulfur and reduce nitrogen oxides without aggravating operation problems of the boilers.

SUMMARY OF THE INVENTION

The purpose of this invention is to reduce emission of sulfur dioxides and nitrogen oxides by retrofitting this invention to existing slagging combustors. This reduction is accomplished by reducing the excess air level, control of the temperature between 2000°–2500° F., and control of the slag chemistry.

DETAILED DESCRIPTION OF THE INVENTION

This invention is applicable for retrofit to all slagging combustors where wall-, opposed-, or tangentially-fired wet bottom furnaces or slagging cyclone combustors. The invention is applicable to all combinations of carbonaceous fuels which can be fired in slagging furnaces.

Capture or retention of sulfur have been limited at normal conditions of combustion which are temperatures between 2100° and 3000° F. and excess air levels between 15 and 30 percent. Sulfur capture by limestone injection has increased the sulfur removal by about 30 percent but is expensive, may increase the particulate emission, may result in fouling, and may be difficult to retrofit.

This invention discloses a method to enhance the retention of sulfur in the slag of slagging combustors. This approach may be able to achieve 70 percent retention of sulfur for some coals. The retention of 36 to 100 percent is possible with a number of Ohio coals assuming complete reduction of Ca, Mg and Fe to sulfides as shown in Table I. That sulfur retention may be increased by adding Mg, Ca or Fe compounds to the slag. The process is inexpensive, can be controlled to minimize tube wastage and can be easily retrofit to all slagging combustors.

TABLE I

| COAL NUMBER | CaO | MgO | $Fe_2O_3$ | S | $\frac{Mg}{S}$ | $\frac{Ca}{S}$ | $\frac{Fe}{S}$ | $\frac{M}{S}$ |
|---|---|---|---|---|---|---|---|---|
| 1713 | 1.38 | 1.18 | 27.89 | 3.20 | 0.0384 | 0.0320 | 0.4532 | 0.5236 |
| 1837 | 1.32 | 0.83 | 22.60 | 3.02 | 0.0286 | 0.0325 | 0.3891 | 0.4502 |
| 1520 | 1.28 | 0.54 | 17.02 | 1.65 | 0.0341 | 0.0576 | 0.5364 | 0.6281 |
| 288 | 2.00 | 0.82 | 23.34 | 2.40 | 0.0355 | 0.0619 | 0.0557 | 0.6031 |

TABLE I-continued
OHIO COAL DATA
OCTOBER, 1985

| COAL NUMBER | CaO | MgO | Fe$_2$O$_3$ | S | $\frac{Mg}{S}$ | $\frac{Ca}{S}$ | $\frac{Fe}{S}$ | $\frac{M}{S}$ |
|---|---|---|---|---|---|---|---|---|
| 430 | 0.75 | 1.03 | 19.79 | 1.79 | 0.0599 | 0.0311 | 0.5749 | 0.6659 |
| 1459 | 2.17 | 1.13 | 13.32 | 1.79 | 0.6057 | 0.0901 | 0.3869 | 0.5427 |
| 1463 | 1.46 | 1.15 | 16.16 | 1.70 | 0.0704 | 0.0638 | 0.4943 | 0.6285 |
| 2151 | 2.21 | 0.83 | 15.00 | 0.65 | 0.1328 | 0.2526 | 0.2000 | 0.15854 |
| 2171 | 2.29 | 0.41 | 14.41 | 3.84 | 0.0111 | 0.0443 | 0.1951 | 0.2505 |
| 643 | 1.09 | 0.36 | 40.04 | 3.78 | 0.0099 | 0.0214 | 0.5508 | 0.5821 |
| 1439 | 0.91 | 0.29 | 45.46 | 6.03 | 0.0050 | 0.0112 | 0.3920 | 0.4082 |
| 2195 | 0.88 | 0.61 | 27.23 | 3.46 | 0.0183 | 0.0189 | 0.4092 | 0.4464 |
| 404 | 1.71 | 0.36 | 17.28 | 2.89 | 0.0129 | 0.0440 | 0.3109 | 0.3678 |
| 53 | 2.17 | 0.35 | 22.73 | 2.91 | 0.0125 | 0.0554 | 0.4062 | 0.474 |
| 61 | 2.36 | 0.69 | 13.20 | 2.31 | 0.0311 | 0.0759 | 0.2971 | 0.4041 |

Since percent ash was not available on an individual basis, the month average of 13.00% was used.

Figure 1:
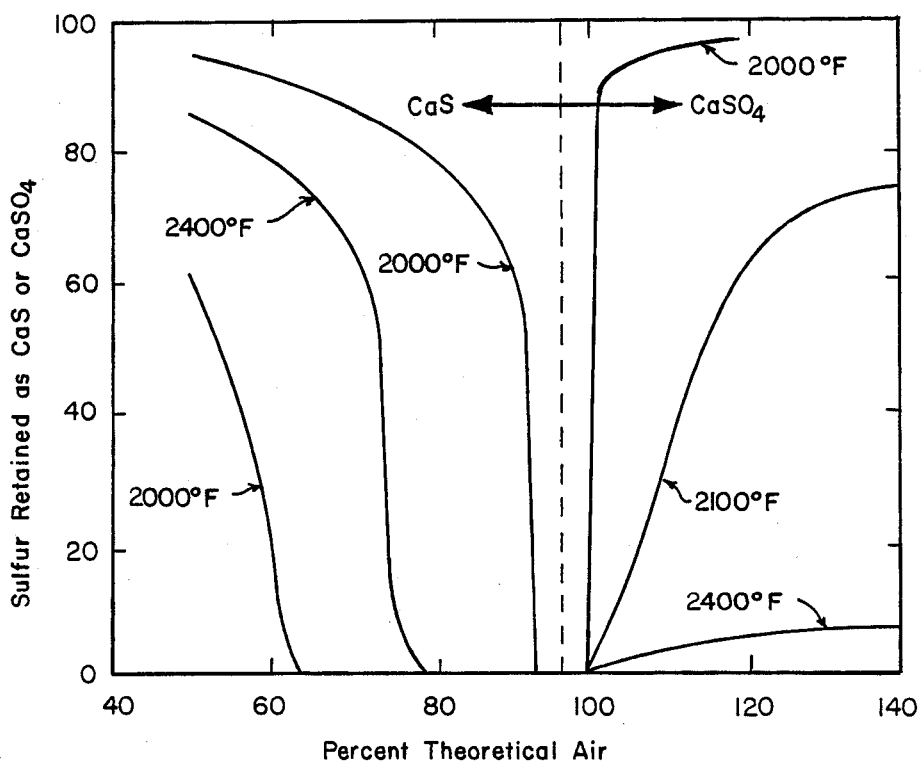
FIG. 1 is a graph which shows the stoichiometric and temperature conditions which favor sulfur retention in the slag.

In our method sulfur is retained as sulfides in the slag. FIG. 1 shows that sulfur can be retained in the slag as a sulfide or sulfate. Sulfites could also be formed during combustion, but sulfites are generally unstable at boiler conditions. When there are excess air conditions, sulfur is retained as sulfates. Potential sulfate retention approaches 95 percent at 2000° F., but is rapidly reduced at increased temperatures. Less than 10 percent of the sulfur can be retained as sulfates at 2400° F.

Sulfur will form sulfides when there is insufficient air for complete combustion. Retention of the sulfur as sulfites at high temperatures is improved under rich conditions. About 80 percent of the sulfur could be retained as sulfide at 2400° F. and 75 percent theoretical air. The stoichiometry illustrated in FIG. 1 refers to that in contact with the surface of the slag. The effective stoichiometry in the slag may be richer than the gas phase for three reasons. First, coal burns on the surface and depletes oxygen at the surface. Second, oxygen transport into the slag will be slow because of small O$_2$ slag diffusion coefficient and limited mixing in the slag. Third, pyrites (FeS$_2$) which are substantially liberated from the coal during crushing are reducing, and are preferentially thrown into the slag because of their high density.

Figure 2:
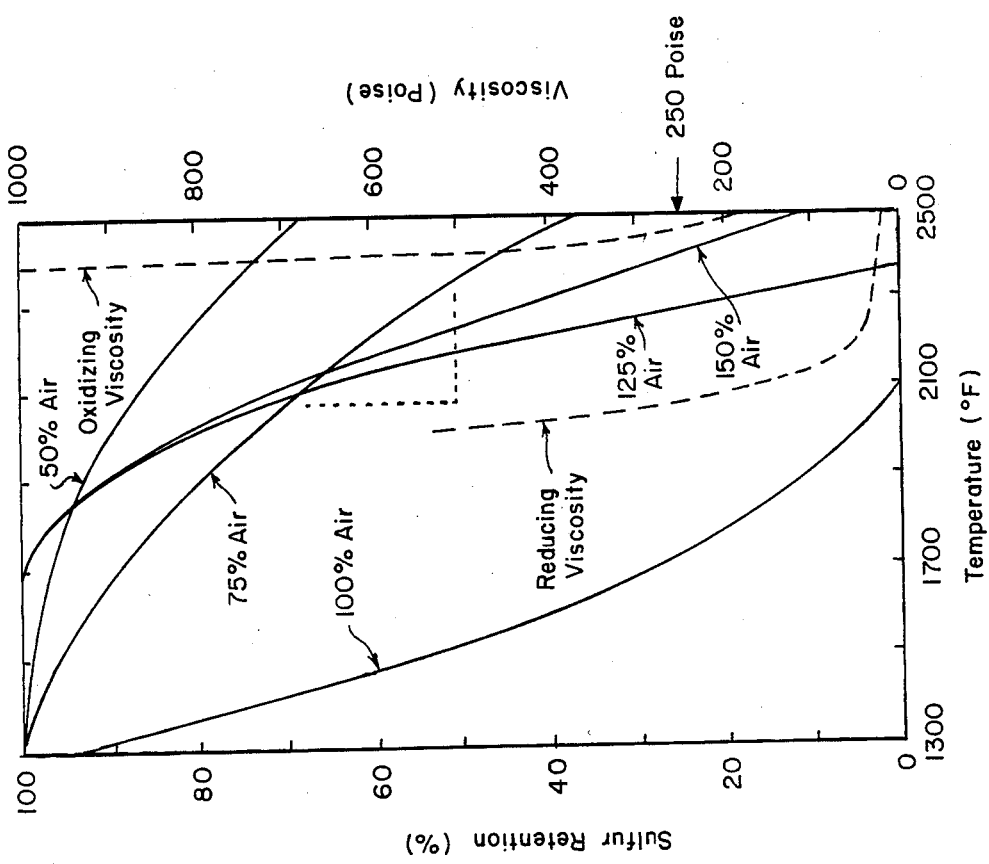
FIG. 2 is another graph which establishes the stoichiometric and temperature conditions necessary to achieve greater than 50 percent sulfur retention and maintain a drainable slag.

From FIG. 1, we can see that the operating conditions of the boiler can be altered to enhance sulfur capture. However, more than the variables of FIG. 1 must be considered to assure that the boiler performance does not deteriorate. Two parameters of boiler performance are important: (1) slag drain, and (2) tube wastage. Slag drain is a function of slag viscosity which must be less than 250 poise. Therefore, the minimum temperature of the slag is limited by the need to maintain the slag viscosity below 250 poise. FIG. 2 shows that under oxidizing conditions a temperature of 2450° F. is required to maintain the slag viscosity below 250 poise. From FIG. 1, we see that sulfur retention at this temperature will be essentially zero percent at 100 percent theoretical air. The temperature required to maintain the viscosity of the slag below 250 poise is lower, 2100° F. under reducing conditions. At this temperature, almost 70 percent can be captured at 75 percent theoretical air. Therefore, sulfur retention occurs in a limited region of boiler operating conditions. Sulfur retention must occur under slag rich conditions, about 2100° F. to maintain slag flow, and below 2400° to achieve 50 percent retention.

Figure 4:
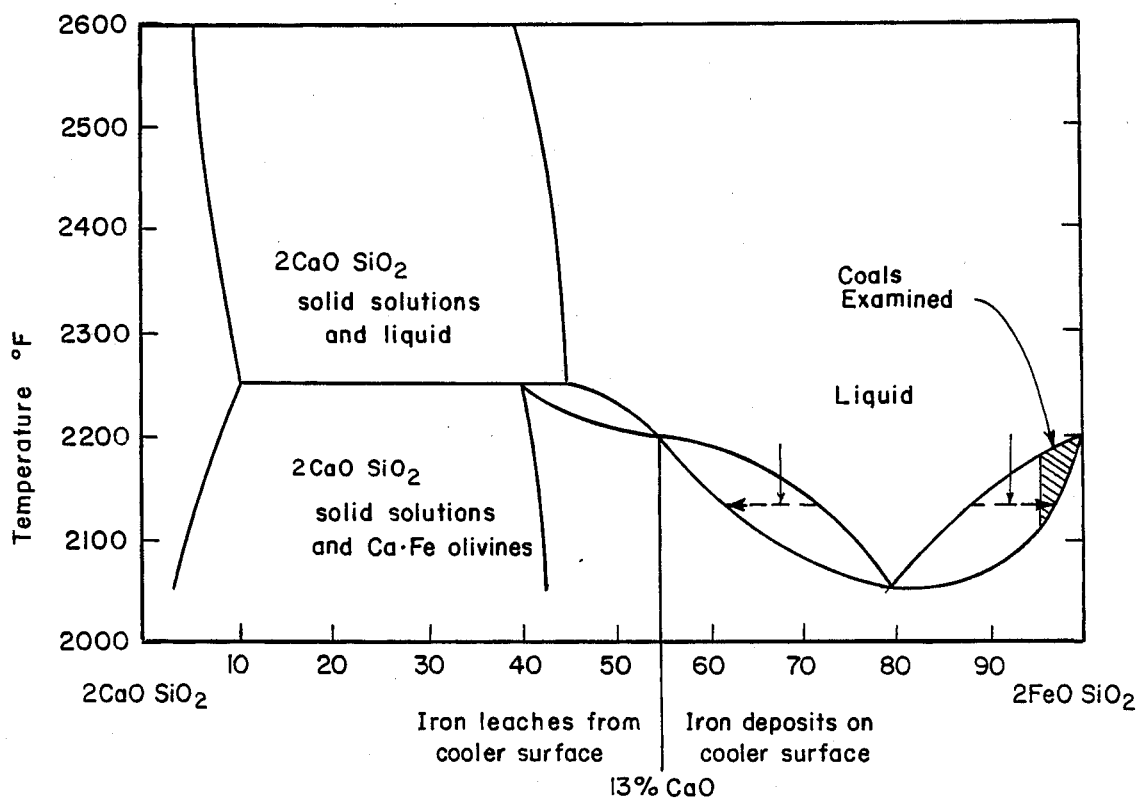
FIG. 4 is a graph which shows the conditions of the slag necessary to minimize tube wastage.
Figure 3:
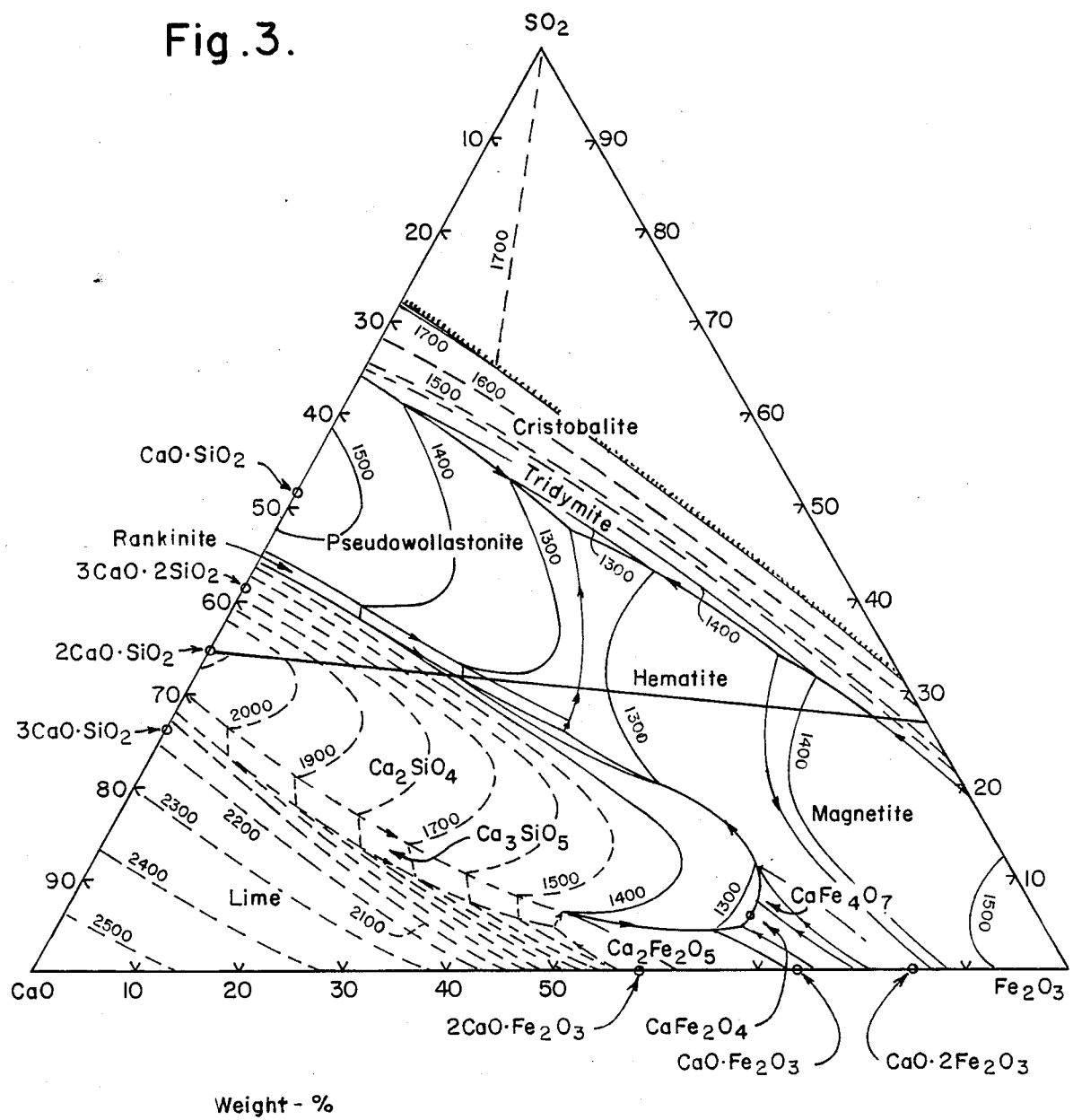
FIG. 3 is an equilibrium phase diagram for an iron slag system.

Slag and gas conditions must be maintained to minimize tube wastage. Traditionally, operation at low excess air has been assumed to accelerate tube corrosion. However, the combustor can be operated with a rich slag without excess tube wastage. FIG. 3 shows the equilibrium phase diagram for the important constituents of slag, Ca, Si and Fe as oxides. Corrosion of the tubes will occur any time the equilibrium compounds in the slag require more iron than can be provided from iron transformations in the slag. A tie line typical for Ohio coals is drawn on FIG. 3 and the cross section through the phase diagram along this line is shown in FIG. 4 as an example. In FIG. 4, the crosshatched area represents the compositions of Ohio coals.

Iron leaching (corrosion) from the tubes can occur in the two phase regions on the right of FIG. 4. Iron will be leached from the tubes at CaO concentrations, greater than 13 percent. No leaching will occur, in fact iron will be deposited at CaO levels less than 13 percent. All the Ohio coals have less than 13 percent CaO and additional CaO could be added to the slag to improve capture before tube corrosion due to the slag occurs.

The method disclosed here to obtain the proper conditions in a slagging combustor to enhance sulfur capture is to control the excess air level and balance the combustors and the fluctuations in the combustors. Excessive fluctuation of the gas phase between rich and lean conditions may be the main cause of corrosion to tubes not in contact with the slag. Reduction, balance, and control of excess O$_2$ levels can be accomplished through use of local oxygen measurements to avoid fluctuating conditions.

The stoichiometry, as well as the temperature, can be controlled in the combustion region by adding 5-20 percent of the heating value of the fuel as an auxiliary fuel. This auxiliary fuel can be oil, natural gas, or pulverized coal. Use of the auxiliary fuel and the location and conditions for injection will control local stoichiometry, temperature, burnout, and aerodynamic conditions to yield the optimum conditions as described above for sulfur retention and boiler operation. An example of one use of auxiliary fuel in a cyclone boiler to control the conditions in the cyclone chambers is shown in FIG. 5.

Two cyclones 10 and 20 are provided in a furnace 30. A carbonaceous material such as pulverized coal is swirled through the cyclone as indicated by arrows 12 and 22. Calcium compounds, magnesium compounds or iron compounds can be added to the pulverized coal to create the desired slag chemistry. Also, high calcium helps lower slag viscosity to prevent accumulations and aid slag run. An auxiliary fuel such as oil or natural gas is injected into the cyclones and burns forming flames 14 and 24. These flames control the oxygen concentration, temperature, burnout and aerodynamic patterns. Sufficient auxiliary fuel is added to create oxidizing conditions within the range of 80% to 120% available theoretical air. Some combustion will occur in the cyclone causing slag to form at the bottom of the cyclone. That slag will leave the cyclone as shown by arrows 16 and 26, and drop to the bottom of furnace 30 and exit through channel 36. At least part of the slag should be rapidly removed from the cyclone to ash pit 37 to prevent slag accumulation on the floor of the cyclone. The furnace 30 typically has been designed to operate at low excess air conditions. However, fuel 12 and 22 is thrown into the furnace at high excess air. That causes a red furnace and reducing floor conditions. The crushed coal has little chance to burn on the floor. The slag formed on the furnace floor will be patchy. If high calcium is present it may flux and separate iron and iron sulfide causing refractory patches and drop-out iron pooling. Because the conditions of the furnace now enhance the formation of sulfides, flue gas leaving the furnace indicated by arrows 38 will have reduced $SO_x$ content.

Figure 5:
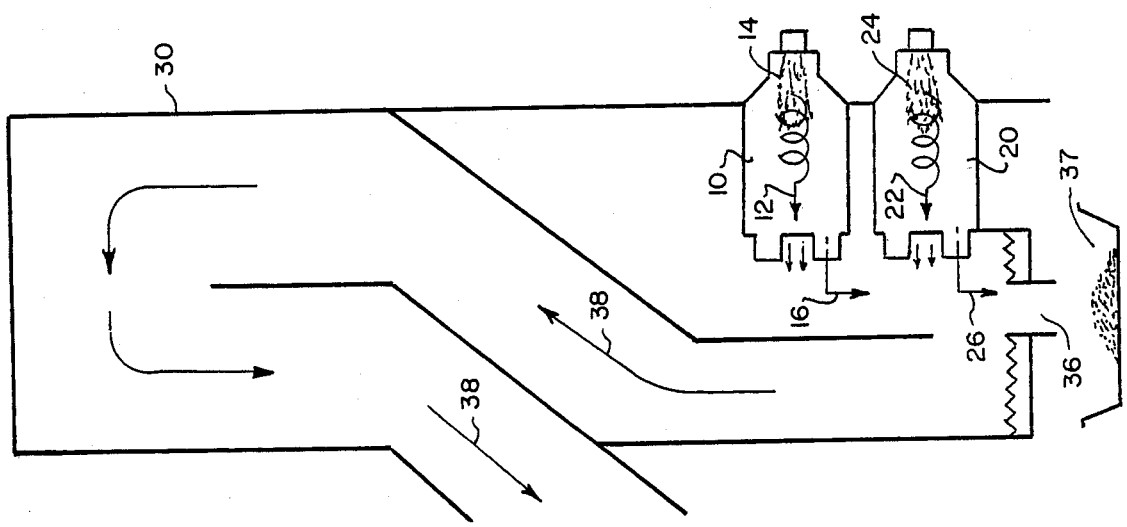
FIG. 5 is a diagram which shows an example of application of this invention to a slagging combustor.

An additional benefit of the embodiment of FIG. 5 is a reduction of $NO_x$. Use of an auxiliary fuel in a cyclone combustor to reduce the excess of air level causes the conversion of fuel nitrogen in the coal to nitrogen oxides. It is well known that coal contains 1-2 percent nitrogen which are either reduced to molecular nitrogen or oxidized to nitric oxide. It is also well known that slagging combustors produce $\frac{1}{2}$ to twice as much nitrogen oxide as dry bottom boilers. The high levels of nitrogen oxide are caused by high excess air availability at high temperatures. Control of nitrogen oxide emission from cyclone combustors has proved difficult. We have found that in our method, with the use of an auxiliary fuel, such as oil, natural gas or pulverized coal, in the cyclone chamber to reduce $O_2$ levels and control temperature, we can reduce nitrogen oxide emissions as much as 50 percent from cyclone combustors.

While we have described certain present preferred embodiments of our method to enhance removal of sulfur compounds by slag, it is to be distinctly understood that our invention is not limited thereto, but may be variously embodied within the scope of the following claims.

We claim:

1. A method for burning carbonaceous material containing sulfer and ash in a slagging combuster so that the sulfer is captured and rejected with the slag without interrupting slag flow and without accelerating corrosion comprising the steps of:
   (a) injecting a carbonaceous material containing sulfer and ash into a slagging combustor;
   (b) causing the carbonaceous material to burn and form a slag;
   (c) maintaining the slag at a temperature within the range of 2000° to 2500° and at a stoichiometry less than oxidizing;
   (d) maintaining a percentage of air available for combustion within the range of 80% to 120%; and
   (e) adding up to 20 percent auxiliary fuel to control and establish combustion conditions necessary for operation.

2. The method of claim 1 wherein the auxiliary fuel is oil.

3. The method of claim 1 wherein the auxiliary fuel is natural gas.

4. The method of claim 1 also comprising adding at least one of calcium compounds, magnesium compounds and iron compounds to establish the necessary operating conditions under claim 1.

5. The method of claim 1 wherein the slag is maintained slightly reducing until drained.

6. The method of claim 1 wherein the slag is maintained at 50° F. to 100° F. above a temperature where the slag has a viscosity less than 250 poise which occurs in the range of 2000°–2500° F.

7. The method of claim 1 wherein the slag is chemically adjusted to certain CaO, FeO, and $SiO_2$ so that CaO is less than 13 percent of the weight percent of a three component mixture of all CaO, FeO, and $SiO_2$ present in the slag.

8. The method of claim 1 wherein at least part of the slag from the combustor is rapidly removed to an ash pit without allowing the slag to accumulate on the floor of the combustor.

* * * * *